United States Patent Office 2,911,678
Patented Nov. 10, 1959

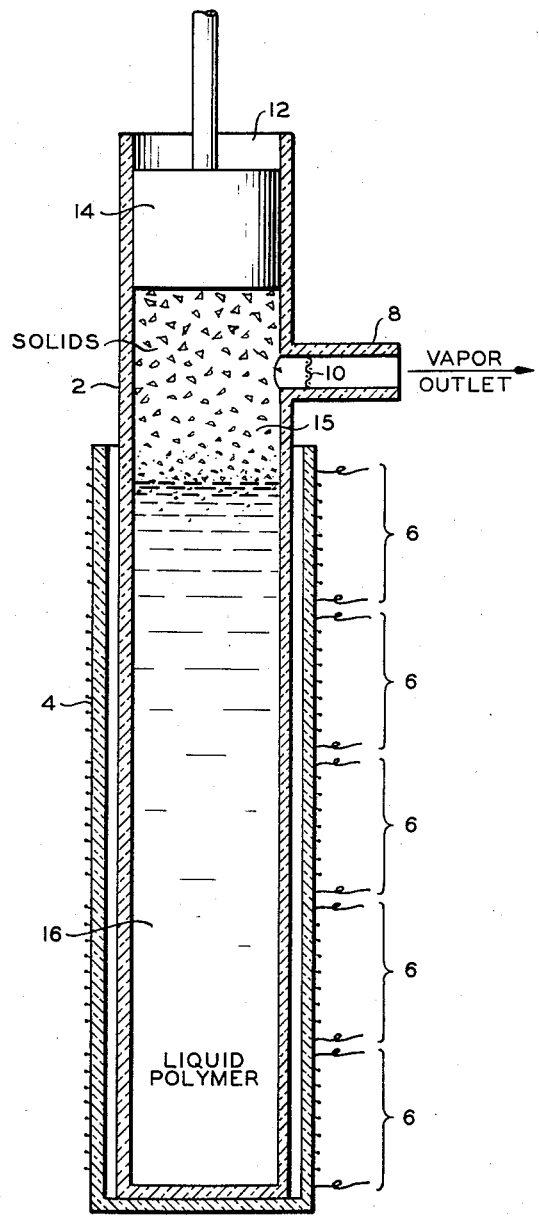

2,911,678

MOLDING OF VOID-FREE OLEFIN POLYMERS USING PRESSURE, VACUUM AND DIRECTIONAL COOLING

Robert J. Brunfeldt, Bartlesville, Okla., assignor to Phillips Petroleum Company, a corporation of Delaware Application April 12, 1957, Serial No. 652,569

9 Claims. (Cl. 18—26)

This invention relates to the molding of thermoplastic materials. In one aspect the invention relates to improved method and apparatus for providing void free articles of thermoplastic resins in a variety of shapes and forms.

Thermoplastic resins find numerous uses in the fabrication of articles having various shapes and forms. Usually it is desirable that the material employed in the fabrication processes be free from voids or pockets both from the standpoint of appearance and to insure uniform strength and wearability.

It is an object of this invention to provide improved method and apparatus for molding thermoplastic materials.

Another object of this invention is improved method and apparatus for molding solid olefin polymers.

Still another object of this invention is to provide improved method and apparatus for molding solid void free articles of olefin polymers.

Yet another object of this invention is to provide improved method and apparatus for producing solid void free articles of olefin polymers in a wide variety of shapes and forms.

The foregoing objectives are achieved broadly by introducing a thermoplastic resin to a molding zone maintained at a temperature above the melting point of said resin and under a pressure below atmospheric, retaining the resin in the molding zone in a liquid state under subatmospheric pressure for a sufficient period of time to remove occluded vapors, compressing the molten resin and thereafter cooling the resin to provide solidification of successive portions thereof whereby voids caused by shrinkage of the resin during cooling are continuously filled with molten resin and a void free resin product is obtained.

In one aspect of the invention the resin is introduced to the molding zone as a liquid.

In another aspect of the invention the resin is introduced to the molding zone as a particulate solid.

In still another aspect of the invention the molding zone is maintained under vacuum during cooling and solidification of the resin.

In yet another aspect of the invention the thermoplastic resin is introduced to the molding zone as a particulate solid, the pressure on said zone is reduced to subatmospheric and sufficient heat is supplied to the molding zone to melt the resin, the molten resin is compressed while maintaining the pressure in the molding zone below atmospheric, and the molten resin is cooled to provide solidification of successive portions of said resin whereby voids caused by shrinkage of the resin during cooling are continuously filled with molten resin and a void free solid product is obtained.

In still another aspect of the invention the resin is also compressed during the melting operation.

This invention is applicable in general to the molding of thermoplastic solid or semi-solid resins which contract on cooling and thus tend to form voids or pockets when molded in any substantial thickness. The invention is particularly applicable in the molding of resins having relatively poor flow characteristics when melted. Illustrative of the materials which can be treated in the method and apparatus of this invention are solid olefin polymers such as for example homopolymers or copolymers of mono-olefins like ethylene, propylene, butylene, etc., also copolymers of mono-olefins and diolefins such as butadiene, isoprene, etc. Other resins which can be molded include acrylic resins such as polyalkyl acrylates, for example polymethyl acrylate, polymethyl methacrylate, polyethyl acrylate, polyethyl ethacrylate, etc.; low-flow styrene polymers, either modified or unmodified, such as butadiene-acrylonitrile-styrene terpolymer, acrylonitrile-styrene copolymer, etc., cellulose acetate, and other resins possessing similar contraction and flow characteristics.

The invention is particularly applicable to the treatment of solid olefin polymers having a density 0.94 or greater at normal atmospheric temperatures, a softening temperature of about 250 to 270° F. and a crystallinity of at least 70 percent at normal atmospheric temperatures.

The following discussion is directed specifically to the treatment of solid olefin polymers, however this is not intended in any limiting sense and it is within the scope of the invention to mold any of the polymers previously mentioned.

Solid olefin polymers are prepared usually by contacting the olefin to be polymerized with a catalyst at an elevated temperature and pressure, preferably in the presence of the solvent or diluent material. The temperature required for polymerization varies over a wide range; however, usually it is preferred to carry out the reaction at a temperature between about 150° F. and about 450° F. The particular temperature to be employed in each individual case depends on the catalyst used, the olefins to be polymerized and the operating conditions employed such as pressure, space velocity, diluent to olefin ratio, etc.

The polymerization pressure is often maintained at a sufficient level to assure a liquid phase reaction, that is at least about 100 to 300 p.s.i.g., depending upon the type of feed material and the polymerization temperature. Higher pressure up to 500 to 700 p.s.i.g. or higher can be used, if desired. When utilizing a fixed catalyst bed the space velocity varies from as low as 0.1 to about 20 volumes of feed per volume of catalyst per hour, with the preferred range being between about 1 and about 6 volumes per volume. The polymerization process can also be carried out in the presence of a mobile catalyst. In this type of operation the catalyst concentration in the reaction zone is usually maintained between about 0.01 and about 10 percent by weight and the feed residence time can be from 10 minutes or less to 10 hours or more.

A preferred polymerization method is described in detail in a copending application of Hogan and Banks, Serial No. 573,877, filed March 26, 1956, and now Patent No. 2,825,721. This particular method utilizes a chromium oxide catalyst containing hexavalent chromium, with silica, alumina, silica-alumina, zirconia, thoria, etc. In one embodiment of this application, olefins are polymerized in the presence of a hydrocarbon diluent, for example an acyclic, alicyclic or aromatic compound which is inert and in which the formed polymer is soluble. The reaction is ordinarily carried out at a temperature between about 150° F. and about 450° F. and usually under a pressure sufficient to maintain the reactant and diluent in the liquid state. The polymers produced by this method, particularly the polymers of ethylene, are characterized by having an unsaturation which is principally either transinternal or terminal vinyl, depending on the particular process conditions employed. When low reaction temperatures, about 150° F. to about 320° F., and a mobile catalyst are used for polymerization, the product polymer is predominantly terminal vinyl in structure. When polymerization is carried out at higher temperatures and in a fixed catalyst bed, the polymer has predominantly transinternal unsaturation. Polymers prepared by both methods are also characterized by their high densities and high percentage of crystallinity at normal atmospheric temperatures.

Other less advantageous and nonequivalent procedures which employ different catalysts are also used for preparing olefin polymers. For example, polymers are prepared in the presence of organometallic compounds such as triethyl aluminum plus titanium tetrachloride, mixtures of ethylaluminum halides with titanium tetrachloride, and the like. Another group of catalysts which is used comprises a halide of a group IV metal such as, for example, titanium tetrachloride, silicon tetrabromide, zirconium tetrachloride, tin tetrabromide, etc. with one or more free metals selected from the group consisting of sodium, potassium, lithium, rubidium, zinc, cadmium and aluminum.

The solvent or diluent employed in the polymerization reaction includes in general, paraffins which dissolve the polymers at the temperature employed in the reaction zone. Among the more useful solvents are paraffins having between about 3 and 12 carbon atoms per molecule, such as, for example, propane, isobutane, n-pentane, isopentane, isooctane, etc., and preferably those paraffins having 5 to 12 carbon atoms per molecule. Also useful in the polymerization reaction are alicyclic hydrocarbons, such as cyclohexane, methylcyclohexane, etc. Aromatic diluents are also used, however in some instances they (or impurities therein) tend to shorten the catalyst life, therefore their use will depend on the importance of catalyst life. All of the foregoing and in addition other hydrocarbon diluents which are relatively inert and in the liquid state at the reaction conditions may also be employed in carrying out the reaction of olefins to form solid polymers.

In carrying out the invention in one embodiment thereof solid olefin polymer prepared in accordance with the foregoing discussion, such as ethylene polymer, is introduced to a molding zone wherein the polymer is maintained in a liquid state under subatmospheric pressure until occluded vapors are removed therefrom, after which successive portions of the polymer are subjected to cooling until the entire contents of the mold become solid. The polymer is introduced to the molding zone either as a liquid or as a particulate solid such as, for example in the form of pellets, prills, or chunks of polymer. Heating of the molding zone is provided by any suitable means such as, for example by providing an electrical heating element around the outer surface of the zone, by providing a double wall vessel with heated fluid in the annular space, or by other suitable means. If the polymer is introduced to the molding zone as a liquid it is preferable that the zone be heated, before introduction of the polymer, to a temperature sufficient to maintain the polymer in the liquid state. If the polymer is introduced to the molding zone as a solid the zone can be heated either before, during, or after introduction of the polymer.

Due to the physical characteristics of the materials treated, gases which are present in the mold, enter with the polymer or are formed during heating of the polymer in the molding zone, tend to remain in the polymer thus forming voids upon cooling and solidification of the polymer. To avoid the formation of these voids the molding zone is maintained under subatmospheric pressure whereby gases are readily removed from the polymer and the molding zone. The pressure employed will vary depending upon the particular polymer being molded, the quantity of gases present in the vessel, and the time required for evacuating said gases. Usually it is desirable to maintain as low a pressure as possible, however an absolute pressure in the range of about 1 to about 500 millimeters of mercury can be employed.

Further due to the poor flow characteristics of the polymer this material in the liquid state tends to adhere to the inner surface of the molding zone. Inasmuch as the polymer contracts upon cooling unless molten polymer is continuously supplied to the region adjacent to where solidification is taking place voids or depressions tend to occur in the solid polymer product. It is for this reason that the polymer is placed under compression during the cooling and solidification portion of the molding process. By compressing the polymer sufficient force is supplied to move adhering polymers from the walls of the molding zone to the region where solidification is taking place. The amount of pressure required to effect formation of void free solid polymer products varies depending upon the other conditions under which the molding operation is carried out. Thus, for example, subatmospheric pressure in the molding zone although preferred is not necessary during cooling and solidification of the polymer. When the cooling and solidification portion of the molding operation is carried out under nonvacuum conditions it is desirable that the polymer be compressed at a pressure of between about 5 and about 500 p.s.i.g. Higher pressures can be employed, however usually they are not required.

When the cooling and solidification operation is carried out however with the molding zone at subatmospheric pressures the pressure exerted by the atmosphere or even a lower pressure is adequate to provide sufficient compression of the polymer.

When carrying out the invention by introducing the polymer to the molding zone in the form of particulate solids, it may be desirable, as an aid in the melting operation, to provide compression of the particulate polymer whereby this material is forced into the melted liquid. However, compression of the polymer during this stage of the operation is optional.

One of the major difficulties encountered in molding solid articles from a thermoplastic resin is due to the manner in which solidification of the resin takes place. Cooling of the mold causes the resin to form first an outer solid shell, the inner body of resin remaining a molten core. The shrinkage which occurs when the core solidifies causes formation of undesirable voids.

An important element of the invention lies in the sequential cooling of the liquid polymer, namely the cooling of successive portions of the polymer whereby voids caused by shrinkage of the polymer during cooling are continuously filled with melted polymer. Various methods and apparatus can be provided to accomplish this result, thus if heating of the molding zone is carried out electrically, such as by a heating coil around the outer surface and disposed along the length of the molding zone, successive sections of the coil can be disconnected whereby cooling of successive portions of the polymer is effected by dissipation of the heat to the atmosphere. If positive cooling is provided, such as by indirect heat exchange of the polymer with a cooling fluid, provision can be made to provide such cooling to successive portions of the molding zone. The cooling rate employed depends on the shape and thickness of the material to be cooled and also the type of polymer or resin which is being treated. Thus, for example, when cooling an ethylene polymer in the shape of a circular rod having a diameter of about 3 inches, it has been found that atmospheric cooling requires between about 2 and about 6 hours for each 6 inches of polymer rod solidified. The quantity of polymer cooled in each successive cooling step also varies with the shape and thickness of the molded polymer or resin product and the type of material which is being treated. For example, when cooling an ethylene polymer in the shape of a circular rod it has been found desirable to limit the length of each section cooled to a maximum of between about 1½ and about 3 times the rod diameter, with shorter lengths being preferred as the rod diameter increases.

In order to more clearly describe the invention and provide a better understanding thereof reference is had to the accompanying drawing which is a diagrammatic view in cross-section of an elongated molding chamber suitable for carrying out the invention. Referring to the drawing, the molding chamber comprises an elongated cylindrical vessel 2, the lower portion of which is surrounded by an annular heating vessel 4 supplied with individual heating coils 6 spaced along the outer surface of the heating vessel, a vapor outlet 8 openly communicating with the molding chamber located above the heating vessel, containing a screen 10, and a piston 14 in the upper portion of the molding chamber adapted to seal the top of said chamber and to move up and down in said chamber.

In the operation of the aforedescribed apparatus piston 14 is removed from the molding chamber 2, a thermoplastic resin, in this specific example in a solid form, is introduced to the molding chamber through opening 12 in a sufficient quantity to provide a level of liquid resin 16 therein below vapor outlet 8. After introduction of the resin the top of the molding chamber is sealed either by reinserting piston 14 or by other appropriate means and a vacuum producing means (not shown) is attached to vapor withdrawal means 8 whereby the pressure in the molding chamber is reduced below atmosphere. Heating is supplied to the molding chamber through coils 6 to provide a temperature, in the portion below vapor outlet 8, above the melting temperature of the resin. In this manner the bottom portion 16 of the resin is melted while the upper portion 15 remains in the solid particulate state.

With the resin in the molten state evacuation of the molding chamber is continued until such time as the resin is freed from any voids or occluded vapors. At this point the resin is compressed by depressing piston 14 and cooling and solidification of the polymer is initiated. If evacuation of the molding chamber is continued during this stage of the process sufficient pressure is provided by the atmosphere to move piston 14 and compress the melted resin. If the cooling and solidification operation is not carried out under vacuum an external force is applied to the piston. Cooling and solidification of the resin is carried out as a stagewise operation, namely, by first removing heat from the bottom coil 6 until the resin heated by this coil becomes solidified, then terminating heat input to the next higher coil until the portion of the resin in this section of the molding chamber becomes solid, and so on, until the entire resin contents of the molding chamber form a continuous solid void free rod.

When cooling the resin of the type treated in the method and apparatus of this invention, solidification of the resin commences with the material which is adjacent to the inner wall of the molding chamber. As the resin cools and solidifies it contracts which tends to pull the resin from the center of the molding chamber toward the walls. If all of the molten resin in the molding chamber is cooled at the same time voids and depressions are formed in the center portion of the solid product. By utilizing successive or stagewise cooling and by compressing the molten resin, the unmelted resin is continuously forced into voids created during cooling of the resin, whereby said voids are filled and a solid void free product is obtained.

The preceding discussion has been directed to a preferred embodiment of the invention, however, this is not intended in any limiting sense and other apparatus and methods can be used in carrying out the invention. Thus, for example, the invention is not limited to the molding chamber described but can be carried out in chambers of various sizes and shapes. Also, it is within the scope of the invention to provide means for compressing the liquid resin or polymer other than the piston shown. Piston 14 can be a porous piston, permeable to gases but not to liquids, in which case vapor outlet 8 is not required and the vacuum producing means can be attached to opening 12. Also with this type of piston all of the resin in the mold can be melted. It is also within the scope of the invention to introduce the polymer or resin into the lower portion of the molding chamber rather than in the top. Similarly compression of the polymer or resin can be supplied from the bottom rather than from the top of the molding chamber. Further, as previously mentioned, various methods and means can be employed for heating and cooling the molding chamber. As desired mold-freeing agents, such as greases, can be utilized to aid in removing the solid molded product from the molding chamber.

The following examples are presented in illustration of the invention in its various embodiments:

Ethylene polymers were prepared in the presence of a chromium oxide catalyst comprising 2.5 percent chromium as chromium oxide containing 2.2 percent hexavalent chromium supported on silica alumina (90/10). The catalyst was prepared by impregnating silica alumina with 0.76 molar chromium trioxide solution, followed by drying and activation in dry air for several hours.

The conditions obtained during the polymerization reactions and properties of the ethylene polymers are as follows:

|  | Polymer | | |
| --- | --- | --- | --- |
|  | A | B | C |
| Ethylene Feed, lb./hr | 100 | 69 | 69 |
| Cyclohexane Feed, lb./hr | 605 | 425 | 425 |
| Reactor Pressure, p.s.i.g | 420 | 420 | 420 |
| Melt Index | 0.85 | 0.55 | 0.63 |
| Reaction Temperature, °F | 276 | 293 | 298 |
| Productivity, lb. polymer/lb. catalyst | 113 | 69 | 54 |
| Residence time, hours | 1.6 | 1.96 | 1.93 |
| Polymer Concentration, wt. percent | 8.3 | 9.5 | 8.6 |
| Catalyst Concentration, wt. percent |  | 0.19 | 0.26 |

The following examples were carried out using representative samples of the afore described polymers:

Example I

A glass cylindrical mold approximately 1¾ inches in diameter and 16 inches long was filled about two-thirds full of solid ethylene polymer pellets having a diameter of about ⅛ inch and a length of about ⅛ inch. The mold was closed except for a small opening at the top to allow gases to exit therefrom during heating. The mold was placed in an oven and heated to a temperature of between 400 and 450° F., this temperature being maintained until the polymer melted and became translucent. It was noted that even though the polymer was melted there were pockets of occluded gases therein. After the melting was completed the mold was removed from the oven and allowed to cool in air until the polymer solidified. The molded product obtained had many voids and bubbles of occluded gases, particularly in the central portion thereof.

Example II

A similar test was carried out in the same apparatus used in Example I, except in this test the mold was evacuated to provide therein a vacuum of about 1 mm. Hg abs. during the heating and melting operation. This sample was left overnight in the oven. The next morning the mold was examined and it was determined visually that the polymer obtained therein was entirely homogeneous and contained no voids or pockets of occluded gases. The mold was removed from the oven, the vacuum was released, and the mold was cooled in air. The product obtained on cooling contained numerous voids due to the contraction of the polymer and failure of the molten polymer to flow into spaces left during solidification.

*Example III*

This test also employed ethylene polymer prepared as described above, however, the apparatus used was similar to that shown in the accompanying drawing (mold diameter 2 inches) and previously described, with the exception that instead of piston 14 a rubber ball having an uncompressed diameter slightly larger than the inner diameter of the glass mold was employed as a piston. In carrying out this test it was necessary in order to provide the quantity of liquid polymer desired to remove the ball several times during the heating operation and add more solid polymer to the mold as the polymers therein melted. In this test vacuum was employed both during the heating and melting of the polymer and during cooling and solidification of the polymer. In addition the rubber ball was kept in the mold during the entire cooling and solidification procedure. The pressure supplied by the atmosphere served to force the rubber ball against the liquid polymer during cooling, thus tending to force molten polymer into the voids produced by contraction of the cooling polymer. The cooling operation was again carried out in air by eliminating the source of heat to the mold simultaneously. Voids were again obtained in the molten production, however they were less in quantity than in the previous test.

*Example IV*

This test was carried out with an apparatus similar to that of Example III, however, with a mold diameter of about 3 inches. In this test vacuum was maintained during the entire operation, however, the ball piston was not employed. After the polymer was liquid and it had been determined by visual inspection that the polymer contained no voids or occluded gases, cooling and solidification of the polymer was commenced, however, in this operation, as distinguished from all the previous tests, the polymer was cooled in successive portions, starting at the bottom of the mold, by successively discontinuing the introduction of heat through the various heating coils. The product obtained in this test also contained voids due to contraction of the polymer during cooling.

*Example V*

This example was carried out in a similar manner to example IV, however in this example the rubber ball piston was employed during cooling and solidification of the polymer. The polymer rod obtained as a result of this test was determined to be void free.

A number of other examples, which are not discussed in detail, were also carried out wherein the procedure of Example V was followed. In these examples ethylene polymer rods varying in diameter from 2 to 7 inches and in length from about 8 to about 36 inches were prepared, entirely free from voids.

It is to be noted from the preceding examples that when the molding operation is carried out under vacuum, the melted polymer is compressed during cooling and solidification and the cooling and solidification is carried out sequentially to provide solidification of successive portions of the molded material, a molded article is obtained which is entirely free from voids.

Having thus described the invention by providing specific examples thereof it is to be understood that no undue limitations or restrictions are to be drawn by reason thereof and that many variations and modifications are within the scope of the invention.

I claim:

1. Apparatus for molding solid, void-free articles of thermoplastic resin comprising in combination a molding vessel, means for introducing resin to said vessel to provide a predetermined liquid level therein, vacuum means for withdrawing vapor from the molding vessel operatively connected thereto above said predetermined liquid level, means operatively connected to said molding vessel adapted to provide variable heating and cooling through separate portions of the walls of said vessel, and piston means permeable to vapors but impermeable to liquids for compressing resin placed in said vessel.

2. A process for forming a solid void free article of aliphatic olefin polymer which has poor flow characteristics when melted and which contracts on cooling, thus tending to form voids or pockets when molded in any substantial thickness, which comprises introducing said polymer to a molding zone maintained at a temperature above the melting point of said polymer and under a pressure below atmospheric, retaining the polymer in the molding zone in a molten state under a vacuum for a sufficient period of time to remove occluded vapors therefrom, compressing the molten polymer at a pressure not exceeding about 500 p.s.i.g. while maintaining the molding zone under a vacuum and cooling the molten polymer to provide solidification of successive portions of the polymer from a location remote from the region of introduction of molten polymer toward said region whereby voids caused by shrinkage of the polymer during cooling are continuously filled with molten polymer and a void free solid product is obtained.

3. The process of claim 2 in which the polymer is introduced to the molding zone as a liquid.

4. The process of claim 2 in which the polymer is introduced to the molding zone as a particulate solid.

5. A process for forming a solid void free article of aliphatic olefin polymer which has poor flow characteristics when melted and which contracts on cooling, thus tending to form voids or pockets when molded in any substantial thickness, which comprises introducing said polymer in a particulate form to a molding zone, reducing the pressure in said zone to subatmospheric, heating the zone to a sufficient temperature to melt said polymer, compressing the molten polymer at a pressure not exceeding about 500 p.s.i.g. while maintaining the vapor pressure in the molding zone below atmospheric and cooling the molten polymer to provide solidification of successive portions of the polymer from a location remote from the region of introduction of molten polymer toward said region whereby voids caused by shrinkage of the polymer during cooling are continuously filled with molten polymer and a void free solid polymer product is obtained.

6. The process of claim 5 in which the polymer is a polymer of ethylene.

7. The process of claim 5 in which the molten polymer is compressed by applying to said polymer a pressure not exceeding atmospheric pressure.

8. The process of claim 5 in which the molding zone is an elongated cylindrical zone of uniform cross section and the solid polymer product is a void free cylindrical rod.

9. The process of claim 2 in which the polymer is a polymer of ethylene.

References Cited in the file of this patent

UNITED STATES PATENTS

| | | |
|---|---|---|
| 2,273,188 | Graves | Feb. 17, 1942 |
| 2,505,807 | Stott | May 2, 1950 |
| 2,586,148 | Clark et al. | Feb. 19, 1952 |
| 2,696,023 | Stott | Dec. 7, 1954 |